(12) United States Patent
Wanami et al.

(10) Patent No.: US 7,331,238 B2
(45) Date of Patent: Feb. 19, 2008

(54) PRESSURE DETECTION DEVICE

(75) Inventors: Shingo Wanami, Kariya (JP);
Toshiyuki Murai, Takahama (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/542,772

(22) Filed: Oct. 4, 2006

(65) Prior Publication Data

US 2007/0085313 A1    Apr. 19, 2007

(30) Foreign Application Priority Data

Oct. 19, 2005    (JP)    ............................. 2005-304346

(51) Int. Cl.
*G01L 7/00*    (2006.01)
(52) U.S. Cl. ..................... 73/714; 361/283.1
(58) Field of Classification Search .......... 73/700–756; 361/283.1–283.4

See application file for complete search history.

(56) References Cited

U.S. PATENT DOCUMENTS

| 5,661,244 | A | 8/1997 | Nishimura et al. |
| 6,047,604 | A * | 4/2000 | Auburger et al. ............. 73/756 |
| 6,191,359 | B1 * | 2/2001 | Sengupta et al. ........... 174/564 |
| 6,453,749 | B1 | 9/2002 | Petrovic et al. |
| 6,769,319 | B2 * | 8/2004 | McDonald et al. ........ 73/866.1 |

FOREIGN PATENT DOCUMENTS

| JP | 02-249740 | 10/1990 |
| JP | 2-140340 | 11/1990 |

OTHER PUBLICATIONS

U.S. Appl. No. 11/519,190, filed Sep. 2006, Wanami et al.

* cited by examiner

*Primary Examiner*—Edward Lefkowitz
*Assistant Examiner*—Jermaine Jenkins
(74) *Attorney, Agent, or Firm*—Harness, Dickey & Pierce, PLC

(57) ABSTRACT

A pressure detection device includes a case unit which has therein an accommodation space and a pressure introduction passage, and a pressure detection unit having a detection surface for detecting a pressure applied thereto. Two ends of the pressure introduction passage respectively have a first opening portion which is opened toward the accommodation space, and a second opening portion which is opened toward an exterior of the case unit. The pressure detection unit is accommodated in the accommodation space. The pressure introduction passage further has a third opening portion which is opened toward the exterior. The pressure detection unit is disposed to detect the pressure, with the first opening portion and the third opening portion being positioned at an upper side of the second opening portion.

7 Claims, 2 Drawing Sheets

PRESSURE DETECTION DEVICE

CROSS REFERENCE TO RELATED APPLICATION

This application is based on a Japanese Patent Application No. 2005-304346 filed on Oct. 19, 2005, the disclosure of which is incorporated herein by reference.

FIELD OF THE INVENTION

The present invention relates to a pressure detection device.

BACKGROUND OF THE INVENTION

Generally, a vehicle is provided with a passenger protecting system for protecting passengers in a collision of the vehicle. The passenger protecting system has, for example, an airbag device for deploying an airbag to protect the head portion or the like of the passenger, and/or a pre-tensioner device for taking up a slack of a seat belt of the vehicle.

The airbag device and the pre-tensioner device are controlled by a control unit such as an ECU. The ECU performs a determination of the vehicle collision based on signals from sensors mounted to the vehicle, and actuates the airbag device and the pre-tensioner device when the vehicle collision is determined.

It is desirable for the passenger protecting system to protect the passenger not only from a vehicle collision in the vehicle traveling direction (i.e., vehicle front-rear direction), but also from a side collision of the vehicle which causes a vehicle-width-direction impact on the vehicle. For example, as disclosed in JP-2-249740A, the airbag device for protecting the passenger from the side collision of the vehicle is provided with a side airbag, which can be deployed according to detection signals of a pressure sensor. The pressure sensor detects a pressure of an inner space of the vehicle door.

Generally, a pressure sensor is provided with a case member in which a sensing unit of a circuit assembly for detecting the pressure is housed, and a passage member defining therein a pressure introduction passage through which the pressure is transferred to a detection surface of the sensing unit. The pressure introduction passage is communicated with the interior of the case member, and has a lower opening portion which is opened downward to be communicated with the exterior of the case member.

Because a circuit board or the like of the circuit assembly which is accommodated in the case member will malfunction due to wetting, the case member is required to have a high watertightness performance. That, liquid is to be restricted from entering the case member except the detection surface, which faces the pressure introduction passage communicated with the exterior.

In this case, the lower opening portion of the pressure introduction passage is opened downward, to restrict liquid and foreign matter from attaining the sensing unit.

However, when liquid such as rain intrudes into the pressure introduction passage through the lower opening portion so that the pressure introduction passage is blocked, the upper space of the pressure introduction passage will become a closed space. Because the gravity of the liquid is counterbalanced due to a pressure decrease of the closed upper space, the liquid is hampered from flowing downward (i.e., from being discharged from pressure introduction passage). Particularly, in the case where the liquid is solidified due to a temperature decrease or the like, the transference of the pressure of the exterior to the detection surface is impaired. Therefore, the reliability of the pressure sensor is lowered.

SUMMARY OF THE INVENTION

In view of the above-described disadvantages, it is an object of the present invention to provide a pressure detection device which has a satisfactory reliability even in a wet environment.

According to the present invention, a pressure detection device includes a case unit which has therein an accommodation space and a pressure introduction passage, and a pressure detection unit housed in the accommodation space. The pressure detection unit has a detection surface for detecting a pressure of an exterior which is applied to the detection surface through the pressure introduction passage. Two ends of the pressure introduction passage respectively have a first opening portion which is opened toward the accommodation space, and a second opening portion which is opened toward the exterior of the case unit. The pressure introduction passage further has a third opening portion which is opened toward one of the accommodation space and the exterior. The pressure detection unit is disposed to detect the pressure, with the first opening portion and the third opening portion being positioned at an upper side of the second opening portion.

Thus, air can be introduced into the pressure introduction passage through the third opening portion which is positioned at the upper side of the second opening portion, to restrict a pressure decrease in the upper portion of the pressure introduction passage when the pressure introduction passage is blocked by liquid and the like having entered therein. Therefore, the liquid and the like can be readily discharged from the pressure introduction passage through the second opening portion. Accordingly, the pressure can be substantially detected via the pressure detection unit.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

A pressure detection device 1 according to a first embodiment will be described with reference to FIGS. 1-2B. The pressure detection device 1 can be suitably used in a passenger protecting system of a vehicle for the sake of a collision detection of the vehicle, for example.

Figure 1:
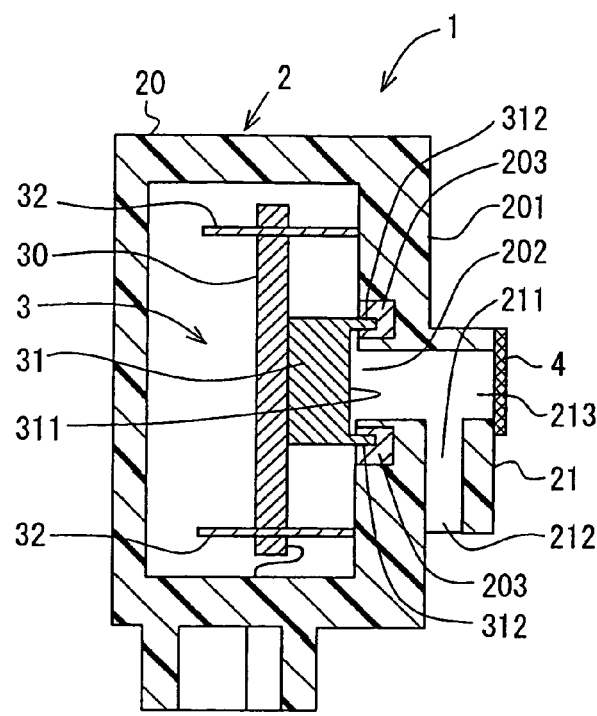
FIG. 1 is a schematic sectional view showing a construction of a pressure detection device according to a first embodiment of the present invention.

As shown in FIG. 1, the pressure detection device 1 is provided with a case unit 2, a circuit assembly 3 and a filter 4. The circuit assembly 3 has a circuit board 30 and a pressure detection unit 31 which is mounted to the circuit board 30. The pressure detection unit 31 has a detection surface 311 for detecting a pressure applied thereto.

The case unit 2 can be made of a resin or the like. The case unit 2 has a housing member 20 defining therein an accommodation space in which the circuit assembly 3 is accommodated, and a passage member 21 defining therein a pressure introduction passage 211. The passage member 21 has a tubelike shape, for example.

The housing member 20 has a housing opening portion 202 (first opening portion), which is arranged at a side wall 201 of the housing member 20 and opened toward the pressure introduction passage 211. That is, in this case, the passage member 21 can be arranged at the outer side of the housing member 20, and connected with the housing member 20 at the housing opening portion 202. Thus, the pressure introduction passage 211 is communicated with the accommodation space of the housing member 20 through the housing opening portion 202.

The housing opening portion 202 can be arranged to face the detection surface 311 of the pressure detection unit 31, so that the pressure of the exterior of the case unit 2 can be transferred to the detection surface 311 through the pressure introduction passage 211 to be detected.

The passage member 21 has a lower opening portion 212 (second opening portion) and an upper opening portion 213 (third opening portion) which are respectively arranged at a lower end and an upper end of the pressure introduction passage 211 (passage member 21).

In this embodiment, the upper side and the lower side are defined with reference to the gravity direction (vertical direction) in a using state of the pressure senor 1. That is, the upper side and the lower side are defined with reference to the gravity direction, for the pressure senor 1 when being attached to the vehicle or the like to detect the pressure therein.

In this case, the lower opening portion 212 is positioned at the lower side of the housing opening portion 202. The lower opening portion 212 and the upper opening portion 213 are opened toward the exterior of the case unit 2, that is, are directly communicated with the exterior of the case unit 2. The pressure introduction passage 211 is communicated with the exterior through the lower opening portion 212 and the upper opening portion 213.

The pressure detection device 1 can be attached to the vehicle or the like in such a manner that the extension direction of the pressure induction passage 211 intersects the horizontal direction. For example, the pressure introduction passage 211 can be arranged to extend in the vertical direction. The housing opening portion 202 and the upper opening portion 213 which are positioned at the upper end of the extension direction of the pressure induction passage 211 can face the vertical direction. The lower opening portion 212 which is positioned at the lower end of the extension direction of the pressure induction passage 211 can face the horizontal direction.

The passage member 21 for defining therein the pressure introduction passage 211 is provided with a predetermined length to maintain air communication between the housing opening portion 202 and the lower opening portion 212.

The circuit board 30 is further provided with a calculation unit (not shown) for calculating the pressure according to detecting signals from the pressure detection unit 31, and an interface (not shown) for sending pressure signals to the exterior, and the like.

In this embodiment, the sort of the circuit assembly 3 is not limited, on condition that the circuit assembly 3 can detect the pressure. For example, the circuit assembly 3 can be a diaphragm typed pressure sensor.

The circuit assembly 3 can be housed in the housing member 20 in such a manner that the detection surface 311 of the pressure detection unit 31 faces the housing opening portion 202. The circuit assembly 3 is fixed to the side wall 201 of the housing member 20 via a connection member 32.

The pressure detection unit 31 is provided with a protrusion portion 312, which is integrated with the detection surface 311 and positioned at a perimeter (i.e., edge) of the detection surface 311. That is, the protrusion portion 312 protrudes from the perimeter of the detection surface 311.

The side wall 201 of the housing member 20 is provided with a recess portion 203, which is arranged at an inner surface (at side of accommodation space of housing member 20) of the side wall 201. That is, the inner surface of the side wall 201 is concaved to construct the recess portion 203. The recess portion 203 is positioned at the periphery of the housing opening portion 202 of the side wall 201. The protrusion portion 312 is inserted in the recess portion 203, so that the interior (accommodation space) of the housing member 20 is closed.

That is, the accommodation space of the housing member 20 can be substantially hermetically closed. Thus, liquid and the like can be restricted from intruding upon the circuit assembly 3 except the detection surface 311. In this case, a seal member can be arranged between the recess portion 203 and the protrusion portion 312.

According to this embodiment, the upper opening portion 213 arranged at the upper end of the passage member 21 is covered by the filter 4 which is breathable (that is, filter 4 permits air communication therethrough). Therefore, liquid and foreign matter can be restricted from entering the pressure introduction passage 211 through the upper opening portion 213, while air communication is kept between the pressure introduction passage 211 and the exterior.

The filter 4 can be fixed to the passage member 21 by, for example, welding the perimeter of the filter 4 to the periphery of the upper opening portion 213, or engaging between the filter 4 and a nail unit arranged at the passage member 21, or bonding via an adhesive tape or an adhesive, or the like.

Figure 4:
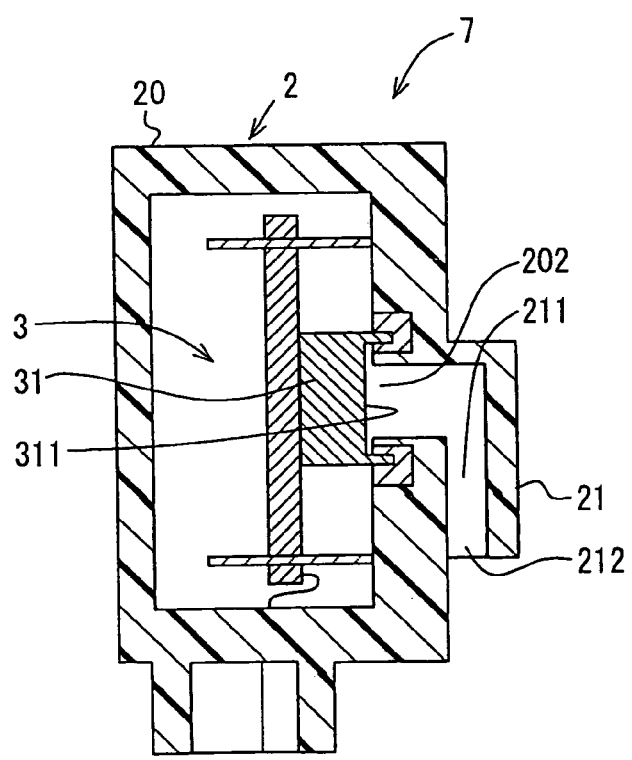
FIG. 4 is a schematic sectional view showing a construction of a pressure detection device according to a comparison example.

Next, a pressure detection device 7 of a comparison example will be described with reference to FIG. 4.

According to the comparison example, the case unit 2 of the pressure detection device 7 includes the housing member 20 which houses the circuit assembly 3, and the passage member 21 which has therein the pressure introduction passage 211 for transferring the pressure of the exterior to the detection surface 311 of the sensing unit 31 of the circuit assembly 3. The pressure introduction passage 211 is provided with only the housing opening portion 202 and the lower opening portion 212 which are respectively arranged at the upper end and the lower end of the pressure introduction passage 211. The housing opening portion 202 faces the detection surface 311. The lower opening portion 212 is opened downward to be communicated with the exterior of the case unit 2.

In this case, when liquid such as rain intrudes into the pressure introduction passage 211 to block the pressure introduction passage 211, the upper space (at upper side of liquid) of the pressure introduction passage 211 will become a closed space. Because the gravity of the liquid is counterbalanced due to a pressure decrease of the closed upper space, the liquid is restricted from flowing downward (i.e., from being discharged from pressure introduction passage 211). Thus, a pressure transference from the exterior to the detection surface 311 is impaired.

According to the pressure detection device 1 of this embodiment, the upper opening portion 213 is additionally provided at the upper side of the lower opening portion 212 of the pressure introduction passage 211 to introduce air into the pressure introduction passage 211 from the exterior of the case unit 2. Thus, when the pressure introduction passage 211 is blocked by the liquid having entered therein, the pressure decrease in the upper space of the pressure introduction passage 211 can be restricted. Therefore, the liquid can readily flow downward to be discharged from the pressure introduction passage 211.

The area of the upper opening portion 213 is not limited. For example, the area of the upper opening portion 213 can be smaller than that of the lower opening portion 212 (which is provided for pressure detection of exterior via detection surface. 311), conditioned that the liquid having entered the pressure introduction passage 211 can be substantially discharged through the lower opening portion 212.

In this case, the upper opening portion 213 can be arranged nearer to the detection surface 311 (housing opening portion 202) than the lower opening portion 212 does. Thus, the liquid intruding upon the proximity of the detection surface 311 can be substantially discharged because of air introduction through the upper opening portion 213. For example, both of the upper opening portion 213 and the housing opening portion 202 can be arranged at the upper end of the passage member 21 (pressure introduction passage 211) and face each other, as shown in FIG. 1.

Next, the effect and the operation of the pressure detection device 1 will be described. In this case, the pressure detection device 1 is suitably used in a collision detecting apparatus which can be provided for the passenger protecting system in the vehicle. The passenger protecting system has a side airbag or the like to protect a passenger from a side collision of the vehicle, for example.

Figure 2A:
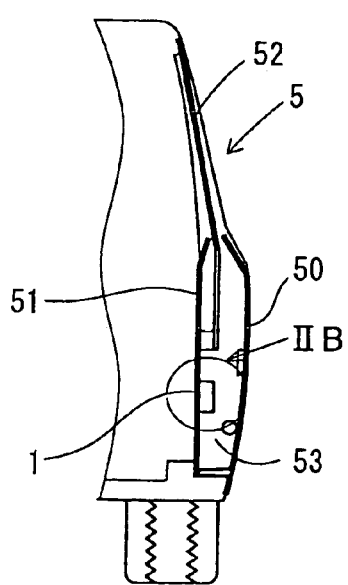
FIG. 2A is a schematic view showing a collision detecting system having the pressure detection device according to the first embodiment.
Figure 2B:
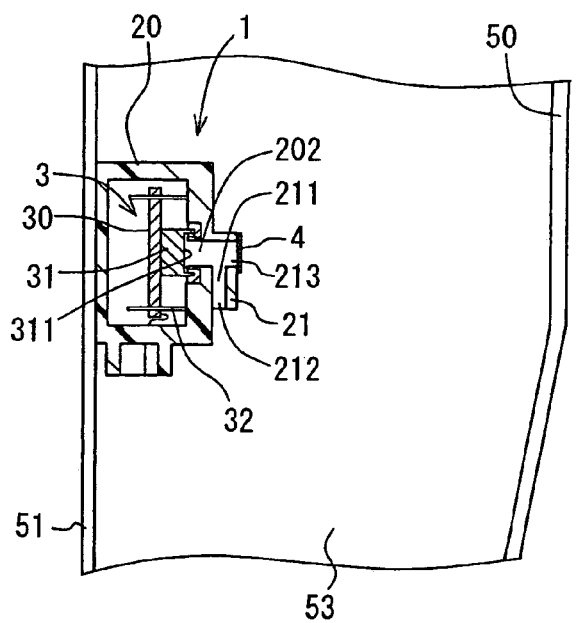
FIG. 2B is an enlarged partially-sectional view showing a part IIB in FIG. 2A.

As shown in FIGS. 2A and 2B, the collision detecting apparatus is provided with the pressure detection device 1, which is mounted in a space 53 formed in a door 5 of the vehicle to detect a pressure variation (due to deformation of door 5 caused by side collision or the like) of the interior of the door 5. The side airbag or the like can be actuated when the collision detecting apparatus has detected the side collision of the vehicle.

In this case, the pressure detection device 1 is attached to the door 5 in such a manner that the extension direction of the pressure introduction passage 211 intersects the horizontal direction (for example, in such a manner that pressure introduction passage 211 extends in the substantially vertical direction).

The door 5 has an outer panel 50, an inner panel 51 and a window glass 52. The outer panel 50 constructs a part of an exterior member of the vehicle. The inner panel 51 constructs a part of an interior member of the vehicle. That is, the inner panel 51 is positioned at the side of a passenger compartment of the vehicle.

The door 5 has therein the substantially closed space 53 between the outer panel 50 and the inner panel 51. The space 53 is provided with a small communication (fluid communication) with the exterior of the door 5. When the pressure (air pressure) of the exterior of the door 5 varies, the pressure (air pressure) in the space 53 of the interior of the door 5 also varies. The space 53 is formed in such a manner that the pressure in the space 53 (i.e., inner pressure of door 5) will increase when the capacity (i.e., volume) of the space 53 sharply varies.

For example, when there occurs a collision between an obstacle and the door 5 of the vehicle, the obstacle contacts the outer panel 50 of the door 5 and presses the outer panel 50 toward the inner side (side of passenger compartment) of the vehicle. Thus, the outer panel 50 is deformed to protrude toward the side of the inner panel 51. Because the impact due to the collision is not directly applied to the inner panel 51, the shape of the inner panel 51 can be temporally maintained.

Therefore, in the case where the outer panel 50 is deformed due to the collision, the capacity of the space 53 of the interior of the door 5 will be sharply reduced. The amount of the fluid communication between the space 53 and the exterior of the door 5 is relatively small, and as such, the pressure in the space 53 increases significantly. The pressure in the space 53 is detected by the pressure detection device 1.

When the pressure in the space 53 of the 5 increases, the pressure around the pressure detection device 1 will also increase. The space 53 is communicated with the housing opening portion 202 through the pressure introduction passage 211 having the lower opening portion 212 and the upper opening portion 213. Thus, the pressure is applied to the detection surface 311 of the circuit assembly 3 which is arranged in the housing member 20, to be detected.

The pressure signals detected by the circuit assembly 3 can be sent to an airbag ECU (not shown) which performs a determination of the collision based on the pressure signals. The side airbag or the like will be deployed when the collision is determined.

According to the first embodiment, the pressure detection device 1 can be attached to the door 5 of the vehicle in such a manner that the pressure introduction passage 211 extends in the substantially vertical direction. In this case, the circuit assembly 3 detects the pressure, with the lower opening portion 212 being positioned at the lower side of the housing opening portion 202 and with the upper opening portion 213 being positioned at the upper side of the lower opening portion 212.

The upper opening portion 213 is covered by the breathable filter 4 which restricts water and foreign matter from entering the pressure introduction passage 211. Therefore, even when liquid such as water enters the door 5, liquid can be restricted from entering the pressure introduction passage 211 through the upper opening portion 213.

Moreover, because the upper opening portion 213 covered by the breathable filter 4 is arranged at the upper side of the lower opening portion 212 of the pressure introduction passage 211, the pressure decrease of the upper portion of the pressure introduction passage 211 can be restricted even when liquid enters the pressure introduction passage 211 through the lower opening portion 212. Therefore, the liquid can be readily discharged from the pressure introduction passage 211 through the lower opening portion 212.

Thus, the pressure detection device 1 can substantially detect the pressure, so that the collision detecting apparatus which determines the vehicle collision based on the pressure detected by the pressure detection device 1 can be provided with an improved reliability.

Second Embodiment

Figure 3:
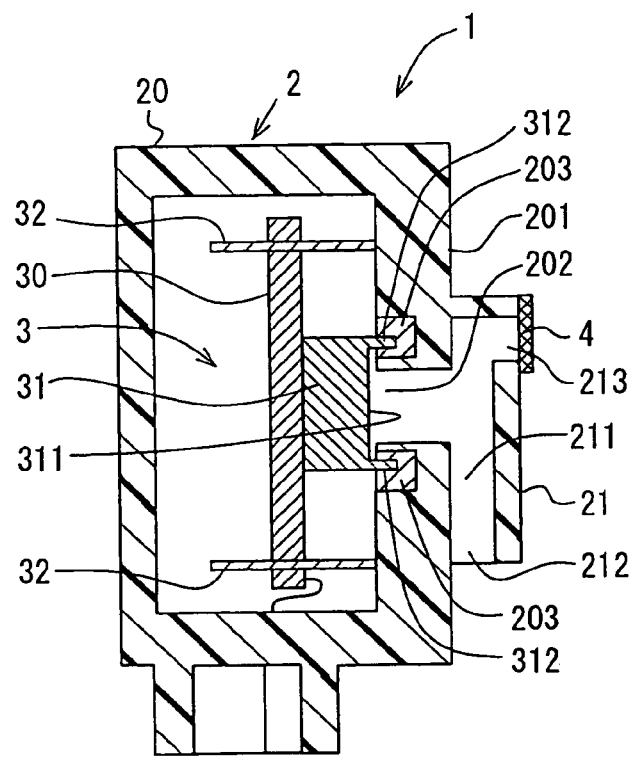
FIG. 3 is a schematic sectional view showing a construction of a pressure detection device according to a second embodiment of the present invention.

A second embodiment will be described with reference to FIG. 3. In this case, the passage member 21 of the pressure detection device 1 further extends toward the opposite side to the lower opening portion 212, so that the upper opening portion 213 and the lower opening portion 212 are respectively arranged at the two opposite sides (in extension direction of passage member 21) of the housing opening portion 202.

In this case, the pressure detection device 1 is attached to the vehicle or the like in such a manner that the upper opening portion 213 is positioned at the upper side of the housing opening portion 202 (detection surface 311). That is, the detection surface 311 is disposed to detect the pressure, with the upper opening portion 213 being positioned at the upper side of the housing opening portion 202 (detection surface 311) and the lower opening portion 212. The upper opening portion 213 is covered by the breathable filter 4.

According to this embodiment, the upper opening portion 213 of the pressure introduction passage 211 is positioned at the upper side of the detection surface 311. Thus, even when liquid enters the pressure introduction passage 211, the liquid can be restricted from intruding upon the detection surface 311 and readily discharged through the lower opening portion 212. Therefore, the liquid and the like can be substantially restricted from building up at the detection surface 311. Accordingly, the pressure can be properly detected by the pressure detection device 1.

About the pressure detection device 1 and the collision detecting apparatus where the pressure detection device 1 is provided, what has not been described in the second embodiment is the same with the first embodiment.

Other Embodiment

Although the present invention has been fully described in connection with the preferred embodiments thereof with reference to the accompanying drawings, it is to be noted that various changes and modifications will become apparent to those skilled in the art.

For example, the housing member 20 can be also provided with a communication aperture which is a through hole for communicating the interior (accommodation space) of the housing member 20 with the exterior.

Moreover, in the above-described embodiments, the third opening portion 213 (upper opening portion) of the pressure introduction passage 211 is opened toward the exterior of the case unit 2. However, the third opening portion 213 can be also arranged at the side wall 201 of the housing member 20 to be opened toward the accommodation space defined in the housing member 20. In this case, the third opening portion 213 is covered by the filter 4 and positioned at the upper side of the second opening portion 212 (lower opening portion). Thus, air can be introduced into the pressure introduction passage 211 from the accommodation space of the housing member 20, to restrict the pressure decrease of the pressure introduction passage 211 when the pressure introduction passage 211 is blocked by liquid having entered therein through the lower opening portion 212.

Such changes and modifications are to be understood as being in the scope of the present invention as defined by the appended claims.

What is claimed is:

1. A pressure detection device comprising:
    a case unit which defines therein an accommodation space and a pressure introduction passage,
    two ends of the pressure introduction passage respectively having a first opening portion which is opened toward the accommodation space and a second opening portion which is opened toward an exterior of the case unit; and
    a pressure detection unit housed in the accommodation space, the pressure detection unit having a detection surface for detecting a pressure of the exterior which is applied to the detection surface through the pressure introduction passage, wherein:
    the pressure introduction passage further has a third opening portion which is opened toward one of the accommodation space and the exterior of the case unit; and
    the pressure detection unit is disposed to detect the pressure, with the first opening portion and the third opening portion being positioned at an upper side of the second opening portion.

2. The pressure detection device according to claim 1, wherein
    the case unit includes a housing member and a passage member which respectively define therein the accommodation space and the pressure introduction passage.

3. The pressure detection device according to claim 1, wherein the third opening portion is nearer to the detection surface of the pressure detection unit than the second opening portion does.

4. The pressure detection device according to claim 1, further comprising
    a filter which is breathable, wherein the third opening portion is covered by the filter.

5. The pressure detection device according to claim 1, wherein
    the pressure detection unit is disposed to detect the pressure, with the first opening portion and the third opening portion being positioned at the upper side of the second opening portion and with the third opening portion being positioned at an upper side of the detection surface of the pressure detection unit.

6. The pressure detection device according to claim 1, wherein the first opening portion faces the detection surface of the pressure detection unit.

7. The pressure detection device according to claim 1, wherein:
    one of a perimeter of the detection surface of the pressure detection unit and that of the first opening portion has a protrusion which protrudes toward other of the perimeters; and
    the other of the perimeters has a recess, into which the protrusion is inserted.

* * * * *